C. L. EGGERT.
Churn.

No. 67,964.

Patented Aug. 20, 1867.

WITNESSES:

INVENTOR:

United States Patent Office.

C. L. EGGERT, OF LAWRENCE, KANSAS.

Letters Patent No. 67,964, dated August 20, 1867.

---

IMPROVEMENT IN CHURNS.

---

*The Schedule referred to in these Letters Patent and making part of the same.*

---

TO ALL WHOM IT MAY CONCERN:

Be it known that I, C. L. EGGERT, of Lawrence, in the county of Douglas, and State of Kansas, have invented a new and improved Churn; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved churn, simple in construction, easily operated, which will bring the butter in a very short time, and by means of which the butter may be gathered into a solid roll or lump before it is taken from the churn; and it consists in the combination and arrangement of the gear-wheels and shafts with each other, with the dashers, and with the frame and body of the churn, and in the dashers, constructed, arranged, and operated as hereinafter more fully described.

Figure 1:
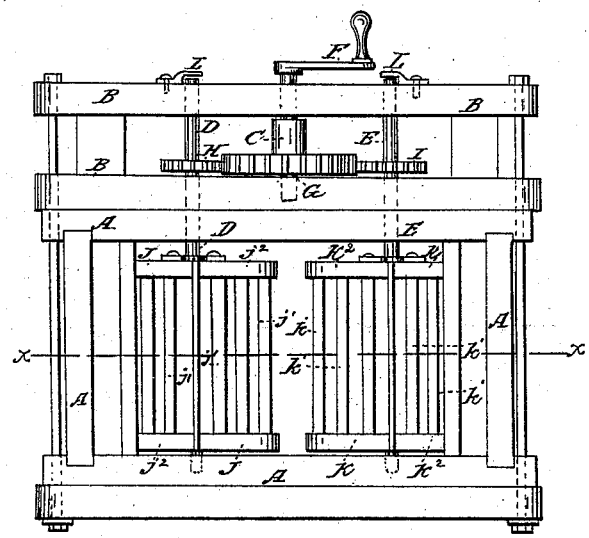
Figure 1 is a top or plan view of my improved churn, the cover being removed.
Figure 2:
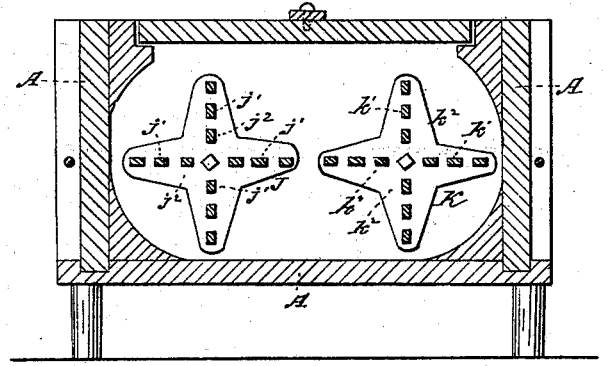
Figure 2 is a vertical longitudinal section of the same taken through the line $x$ $x$, fig. 1.

A is the body of the churn, which is rectangular in form, and has its upper and lower angles at the ends filled up, as shown in fig. 2, so that the ends of the milk-chamber may be nearly circular in form. To one side of the box or body of the churn is securely attached a narrow rectangular frame, B, in which are formed the bearings of the shafts C D E. C is the crank-shaft, to the outer end of which is attached the crank F by means of which the churn is operated. G is a large gear-wheel attached to the shaft C, and the teeth of which mesh into the small gear-wheels H and I attached to the shafts D and E to impart motion to said shafts. The inner ends of the shafts D and E pass through the side of the body A of the churn, and have square tenons formed upon them which enter square sockets formed in or attached to the ends of the dashers J and K. The other ends of the dashers J and K have sockets formed in or attached to them which fit and revolve upon pivoting-pins attached to the side of the churn-body A. The dashers J and K consist of horizontal bars $j^1$ and $k^1$ attached to the radial arms of the end block $j^2$ and $k^2$, as shown in the drawings. By turning the crank F the dashers J and K will both be revolved in the same direction, so that the wings of the dasher, as K, will tend to throw the milk or cream upward in the middle of the churn, which current the wings of the other dasher, as J, will meet and tend to force downward, thus throwing the milk into violent agitation and bringing the butter in a very short time. After the churning is completed, by working the crank F back and forth, the butter will be gathered in a solid roll or lump in the middle part of the churn, from which it can be readily removed. By turning the buttons L that cover the outer ends of the shafts D and E the said shafts may be slid outward, allowing the dashers to be removed from the churn.

Having thus described my invention, what I claim as new, and desire to secure by Letters Patent, is—

The combination and arrangement of the gear-wheels G H I and shafts C D E with each other, with the dashers J K, and with the frame B and body A of the churn, in combination with the double dashers J and K, constructed, arranged, and operated substantially as herein shown and described.

C. L. EGGERT.

Witnesses:
 CHARLES F. EGGERT
 ALEXANDER MARKS.